United States Patent
Del Signore

[15] 3,680,085
[45] July 25, 1972

[54] ANTI-COLLISION APPARATUS FOR VEHICLES

[72] Inventor: Giovanni Del Signore, Via San Matteo in Arcertri 25, Firenze, Italy

[22] Filed: Jan. 21, 1970

[21] Appl. No.: 4,537

[30] Foreign Application Priority Data

Jan. 21, 1969 Italy....................................4428 A/69
Jan. 16, 1970 Italy....................................9325 A/70

[52] U.S. Cl..........................343/14, 343/17.5, 343/112 CA
[51] Int. Cl.................................................G01s 9/24
[58] Field of Search............................343/14, 17.5, 112 CA

[56] References Cited

UNITED STATES PATENTS

| | | | |
|---|---|---|---|
| 3,172,075 | 3/1965 | Kay | 343/14 X |
| 2,965,896 | 12/1960 | Wright et al. | 343/14 X |
| 3,345,633 | 10/1967 | Runge | 343/112 CA |
| 3,188,635 | 6/1965 | Blythe | 343/14 |
| 3,369,232 | 2/1968 | Boucher | 343/14 X |

FOREIGN PATENTS OR APPLICATIONS

592,596 9/1947 Great Britain..........................343/14

Primary Examiner—T. H. Tubbesing
Attorney—Waters, Roditi, Schwartz & Nissen

[57] ABSTRACT

A safety apparatus or anti-collision device to be installed on motor vehicles for detecting and indicating obstacles encountered on a road during conditions of poor or reduced visibility. The apparatus includes wave propagation means to emit a continuous periodically frequency modulated wave with, for example, a triangular pattern. The wave is emitted by an antenna and echo waves reflected by obstacles are received and mixed with a portion of the transmitted wave to obtain a raw signal which is passed through filters to activate one of a plurality of transducers including, for example, light bulbs which are illuminated to indicate the presence and distance of the obstacles. Arrangements are made to limit the number of light bulbs which are illuminated.

5 Claims, 10 Drawing Figures

ANTI-COLLISION APPARATUS FOR VEHICLES

BACKGROUND

This invention relates to safety apparatus or anti-collision devices adapted for being installed on motor vehicles and which are particularly useful when there are conditions of reduced visibility or no visibility whatsoever, and more particularly to apparatus to warn drivers of the presence of a foreign body, particularly other vehicles, blocking the road ahead, and for indicating the distance thereof, and as well to a procedure for displaying signals.

It is an object of the invention to provide for giving improved anti-collision information to drivers.

It is another object of the invention to provide apparatus for indicating the presence of objects off or near the road along which the associated vehicle is travelling. Electronic devices for the detection and location of objects, whether stationary or in movement, as well as for range measurement and display, which are based on the reflection of electromagnetic waves, are well known. They are mainly of the pulsed type.

Although they can give good results, especially under particular circumstances and with the help of special methods of interpretation or representation of the echo signals received, they lose their efficiency when it is necessary to detect and locate small objects at short distances, that is, within about 10 meters.

On the other hand, apparatus that utilizes the frequency modulation technique (so-called CW-FM radar) are very good for the detection and fairly accurate location or ranging of objects at short distances. This is the method on which the present invention is based.

However, known devices of this latter type are not satisfactory and have not been widely used, even though the need for warning systems is great. The reason for this is that such devices do not enable the production of an electromagnetic signal which includes the desired information, nor is it capable of elaborating on this information and separating it from disturbing elements and translating the essential contents into a signal easily dealt with by an operator and, in particular, the driver of a motor vehicle who has limited time to react to a warning signal with an appropriate maneuver.

In the following description, a technique for producing an electromagnetic signal containing all the desired information will be described. Further, a technique for analyzing and translating its essential contents into an easily perceived and comprehensive signal for the operator will be described.

DETAILED DESCRIPTION

The apparatus, which produces an electromagnetic signal containing the desired information in accordance with the invention, is based on the principle described below. A radio transmitting and receiving apparatus will be considered, both working at microwave frequencies. The transmitter emits a continuous wave (CW) of constant amplitude with a frequency varying in time in accordance with a triangular law, as indicated by the solid line shown in FIG. 1. The echo wave, reflected by an hypothetical obstacle — which for the moment will be assumed to be a single one to make the description simpler — and entering the receiver, has the same characteristics as the emitted wave, the only difference being that it is shifted in time by a quantity T, directly dependent on the distance between the apparatus and the obstacle.

Figure 1:
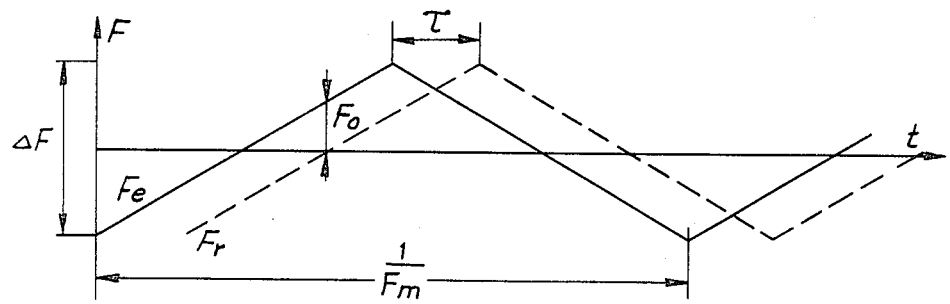
FIG. 1 illustrates, for purposes of explanation, the linear law of modulation of the waves emitted from apparatus of the invention and of a received wave produced by the reflection of the emitted wave by an obstacle.

In the receiver, the echo signal (reflected wave) is heterodyned with a portion of the emitted signal. This (heterodyne) action leads to a frequency conversion, which means that by mixing the two signals (emitted and echo) continuously in a non-linear device (for instance, in a diode), a new signal is generated, particularly a current, having a much lower frequency than that of the emitted and received waves. This frequency, called "beat frequency", is proportional to the obstacle range and thus contains the desired information. This dependence can be determined by easy geometrical considerations. In FIG. 1, the solid line shows the rate of change of the frequency $F_e$ of the emitted wave, and the broken line represents the same for the frequency $F_r$ of the wave reflected by an obstacle, which will be assumed at a distance D. The latter is shifted by a quantity T relative to the first. The time interval T is related to the distance D by the relation $T = 2D/c$ ($c$ being the speed of light with which the electromagnetic waves propagate). There is a difference between the frequency of the transmitted wave and that of the received one, at every instant, called the "beat frequency" and this is expressed by the difference $F_b = F_e - F_r$. This difference is expressed in FIG. 1 as the difference between the two lines at any given instant. The peak to peak width of the frequency modulation diagram is labeled $\Delta F$ (i.e., the difference between the greatest and smallest values of $F_e$); $F_m$ indicates the frequency of the modulation itself. It follows that the temporal interval between the two greatest (or smallest) successive values of $F_e$ is expressed by $1/F_m$. It can be seen that $F_b = 4 \, F \cdot F_m \cdot D/c$. Consequently, the distance of the obstacle is proportional to the beat frequency.

It is supposed that the frequency modulation diagram is triangular. It is clear that if it is of a different shape but composed of linear segments or even if it is not linear, one could still obtain a relationship between the obstacle range and the parameters of the beat signal.

In practice, things do not behave quite so simply because there are more obstacles and therefore the beat signal does not have a simple form. Moreover, there are some disturbing factors, which will be discussed later on. However, even if it is complicated, the beat signal constitutes an electrical signal containing the desired information which must be obtained by means of an adequate analysis and must be communicated in a suitably transformed way to the operator, as will be clarified later. For easier description this signal, to be interpreted and analyzed, will hereinafter be called the "raw signal" and the preferred way of producing it will be described hereafter.

Figure 2:
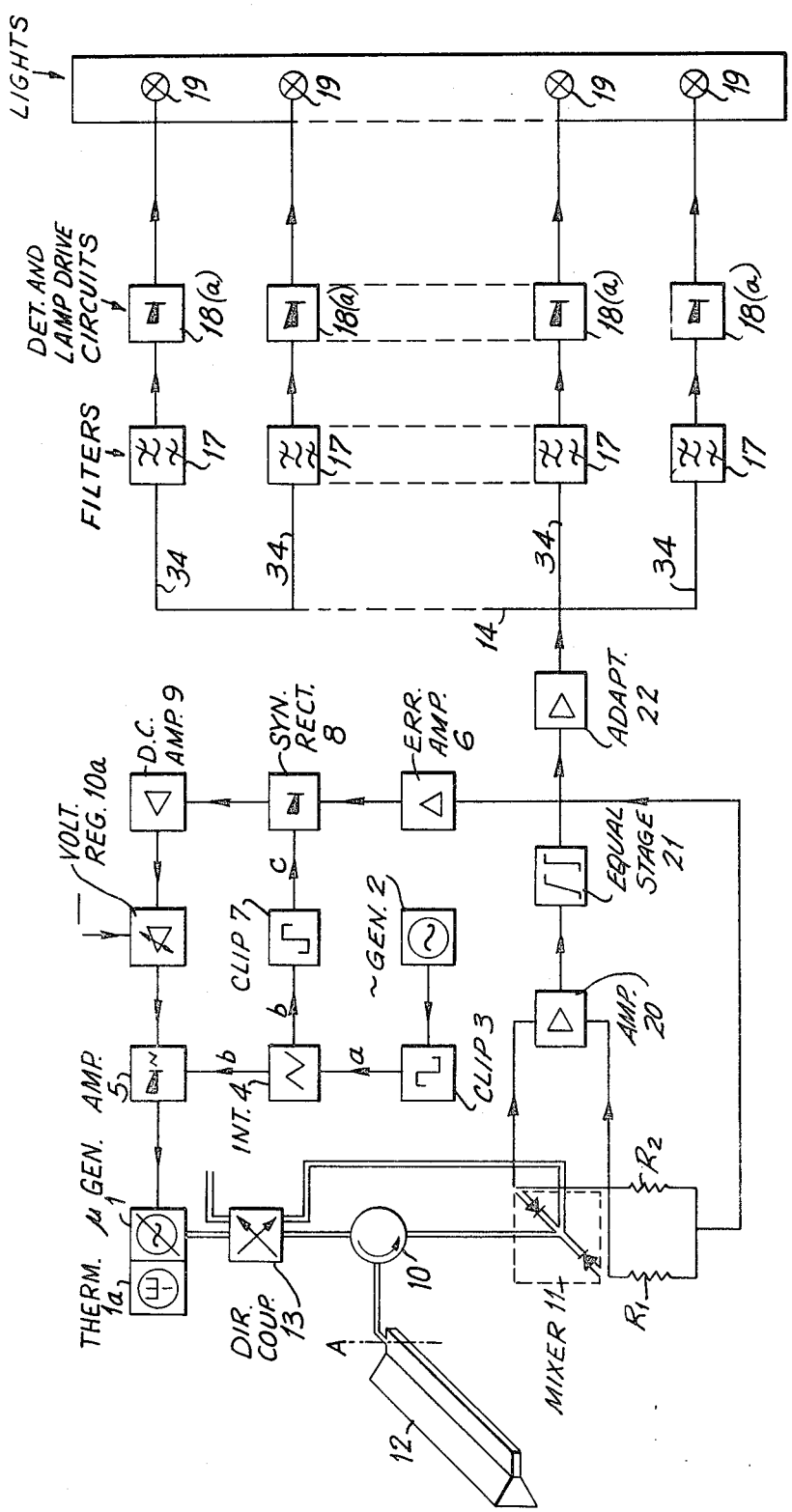
FIG. 2 is a block diagram schematically illustrating an embodiment of the invention.

The transmitting part of the apparatus, schematically illustrated in FIG. 2, includes a microwave generator. The element of generation can be of the reflex-klystron type. Other types of generators can also be used, such as a solid state generator (Gunn, avalanche, etc.), of economical type and working at a small enough wavelength (1–10 cm.). The generator is coupled to a frequency modulator and to an automatic frequency control circuit (AFC).

The receiving part of the apparatus is provided with a mixer (preferably balanced) from which the raw signal is obtained by heterodyning the received signals and a portion of the transmitted signal obtained from a directional coupler or some other device with low coupling coefficient from the transmission line (waveguide, coaxial cable, strip line, etc.) which links the transmitter to the antenna.

The two groups, transmitting and receiving, according to a preferred embodiment, are linked to a single antenna or two antennas by means of suitable transmission lines (waveguides, coaxial cables, strip lines, etc.). The transmitter and receiver are decoupled by a ferrite or hybrid connector (magic Tee or equivalent).

The raw signal is then passed on to the following circuits for elaboration, analysis and presentation of the information to the operator. These circuits will be described later on.

In the form illustrated in FIG. 2, the element of generation I of the microwave oscillations, is a tube of the velocity modulation type, such as a reflex-klystron (for instance, a 2K25 model or a similar tube) of low cost. This tube is coupled to simple auxiliary circuits of low power consumption, working on the 9,000 MHz band (3.2 cm.) and is temperature stabilized by means of a simple thermostat 1a of the bimetallic type or the like. Clearly, shorter wavelengths, down to 1 cm. or less, are useful as also are longer ones up to 5 cm.

The reflex klystron is frequency modulated according to a triangular waveform by modulating, as is well known, its repeller voltage. If a fairly linear frequency modulation is desired, the repeller voltage should oscillate around the value corresponding to the top of one particular voltage mode of the klystron. To satisfy this requirement, an automatic frequency control circuit can be used. In the illustrated example, the part that constitutes the modulator, is formed by a sinusoidal waveform generator 2 at a frequency of about 10 KHz, for example. This signal is applied to a clipping circuit 3 (which can be a voltage comparator or "Schmitt trigger" or a similar circuit) and is converted to a square waveform as is illustrated in the diagram ($a$) in FIG. 4. This same square wave could also be generated directly by a suitable circuit of well known type, such as a multivibrator. Afterwards, the signal ($a$) is applied to the integrating circuit 4, constituted by an operational integrating amplifier, for example, and is reduced to triangular waveform, as illustrated at ($b$) of FIG. 4. This signal is then applied to the klystron repeller after having been amplified in amplifier 5. The desired frequency modulation is thus produced with deviation F (FIG. 1).

In the illustrated example, the frequency stabilization circuit (AFC) is formed by the error amplifier 6, by the clipping circuit 7, by the synchronous rectifier 8, by the d.c. amplifier 9, and by the voltage regulator 10a. The working of this circuital section is based on the particular shape of the resonance curve of the internal cavity of the klystron oscillator, according to an easily understandable method by examining the curve illustrated in FIG. 3.

Figure 4:
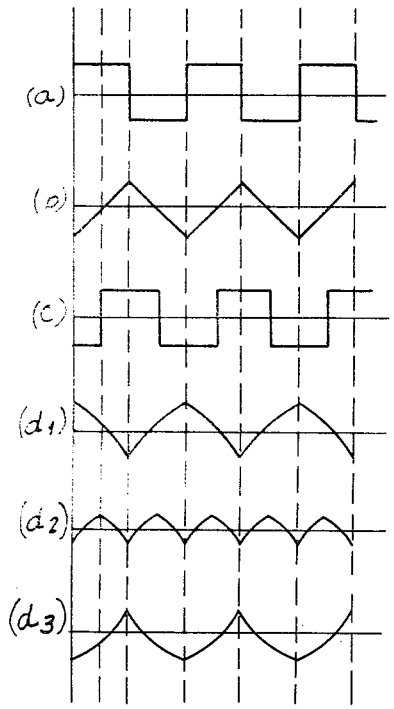
FIGS. 3 and 4 are illustrative diagrams and waveforms relative to the transmitting part of an apparatus of the invention.
Figure 3:
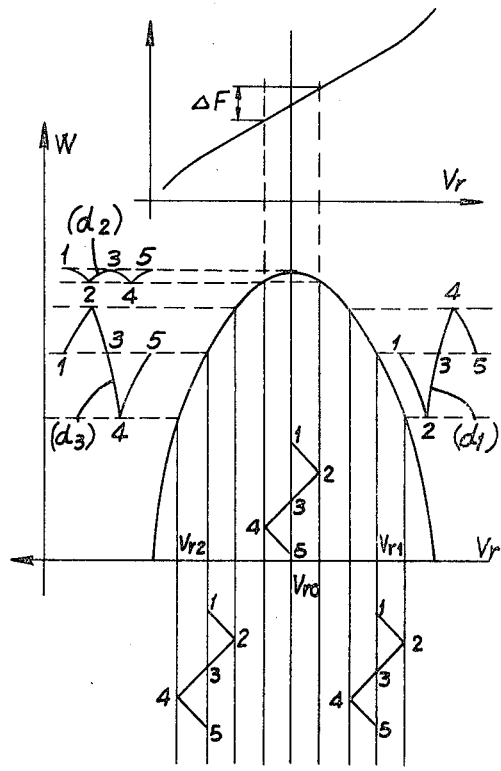

In the abscissa of the curve of FIG. 3 is the repeller voltage $V_r$, and in ordinate is the power output W. There have been drawn three cases of repeller modulation around three distinct mean values of the repeller voltage: $V_{r_1}, V_{r_2}, V_{r_0}$. If the modulation takes place around the value $V_{r_2}$, the radio frequency energy generated by the klystron is also amplitude modulated. This is illustrated by the curve ($d_3$) in FIG. 3, and in FIG. 4 shown on a different scale. This amplitude modulation has the same frequency and phase as the triangular modulation signal ($b$) of FIG. 4, while if the modulation takes place around $V_{r_1}$, one gets again an amplitude modulated signal ($d_1$) in FIG. 3, also shown in FIG. 4, but of opposite phase. Finally, when the klystron oscillates having its cavity tuned for maximum power output, that means with a repeller voltage of mean value $V_{r_0}$, the signal caused by the amplitude modulation has the form indicated by the diagram ($d_2$) of FIG. 3, also shown in FIG. 4, being of double frequency with respect to the modulating voltage ($b$) of FIG. 4.

The three examples as shown are three particular limiting cases, which however are useful to illustrate how the apparatus works even for intermediate cases which can occur in practice.

From a microwave component 11 (FIG. 2), the balanced mixer, one obtains a signal corresponding to the momentary conditions ($d_1, d_2, d_3$ or other intermediate conditions), which is passed through the two resistances $R_1$ and $R_2$ to the selective amplifier 6, tuned to the modulation frequency $F_m$. Thus, when the klystron oscillates at a frequency corresponding to the top of the voltage mode diagram of FIG. 3, the amplifier 6 does not pass the error signal ($d_2$) coming from the mixer, and therefore no error signal enters the frequency control network. When the klystron oscillates out of its cavity resonance point, the amplifier 6 will be concerned with a signal of the type ($d_1$) or ($d_3$) of FIG. 4, that is an error signal at frequency $F_m$ in phase or opposite phase to the modulation voltage ($b$) indicated in FIG. 4. This error signal is applied, together with the reference signal ($c$) of FIG. 4, generated by the clipping circuit 7, to the synchronous rectifier 8, which, working as a phase discriminator, produces a d.c. voltage either of positive or negative sign, depending on the error signal ($d_1$) or ($d_3$), whether in phase or in opposite phase with the reference voltage ($c$) in FIG. 4.

The d.c. voltage mentioned above is first amplified by the d.c. amplifier 9 and is then applied to the voltage regulator 10a which is acting on the repeller voltage in such a way as to hold it at the value $V_r$, at the top of the voltage mode curve, to which corresponds the maximum power output.

Still referring to FIG. 2 the klystron output is coupled through a wave guide indicated by the double line in the drawing, to one of the three ports of a ferrite circulator 10, the other two ports being connected to the antenna 12 and to the balanced mixer 11. A directional coupler 13 is inserted into the guide section between the klystron and the circulator 10. Its purpose is to take a portion of the signal generated by the klystron, which is then applied through a waveguide section to the local oscillator port of the balanced mixer 11, producing the beat signal by heterodyning with the received echo signal.

The circulator 10 must have a low insertion loss, whether in transmission or reception, and an optimum decoupling coefficient. The antenna can be single or double. In the second case, one is used for transmitting and the other for receiving. The choice of either of the two solutions is determined from production cost considerations (in the second case, no circulator is needed), antenna aperture considerations, antenna decoupling and efficiency of decoupling elements.

In the illustrated example, the case of a single antenna has been considered. As far as its directivity is concerned, it is characterized by a narrow beam width in the horizontal plane such as, for example, from 1° to 5°, and preferably from 2° to 4°. In the vertical plane, a larger beam width (10° – 20°) is more desirable. This is to compensate the pitching movement of the vehicle. As an indication of the order of magnitude of the antenna dimensions, if one considers a slotted waveguide type antenna of fairly simple and economical construction, working at a wavelength of about 3 cm., it should be about 0.5 – 1.5 meters long and about 12 cm. high, with respect to the beam widths mentioned above. In the case of smaller wavelengths, the antenna length can be reduced to a few decimeters and the size of the whole apparatus would clearly be very acceptable for a motorcar.

One can also, though this is not generally necessary, make use of a mobile antenna with an alternate scanning movement (sector scanning) in the horizontal plane. The scanning frequency can be any one compatible with mechanical considerations, and the sector angle can be a few degrees. For example, with reference to FIG. 5, this can be carried out using an electromagnet 23 driven by an electrical generator of current 24 with the desired scanning frequency. A magnetic pickup or similar device, mechanically coupled to the electromagnet 23, generates a synchronizing signal for the pulse generator 25. These command pulses are generated at each instant during which the antenna main lobe coincides with the longitudinal axis of the vehicle, or also with another direction or with one or the other of two or more prefixed directions.

The command impulses already mentioned drive the threshold gate circuits 26, inserted in the information display circuits, which will be described later on. This is done in such a way that the obstacle indications to the operator, produced as will be later explained, cannot be given if not during the command pulses. This allows the transducer circuits 18 and 19 to work and the analyzed signals to be displayed. In this way only the obstacles that are in the chosen direction or directions are indicated. This orientation can also be changed by acting on the synchronization of the pulse generator 25. Naturally when the signal display must be sequentially produced in more than one direction a corresponding plurality of threshold gate circuits and relative transducer circuits must be introduced.

Ignoring the scanning movements of the antenna 12, which will be assumed fixed, and returning to the diagram of FIG. 2, a raw signal coming from the mixer 11 and suitably amplified should be, according to the invention, analyzed and translated into a form to be presented to an operator. However, it is best first to elaborate this signal so as to exclude any information that is not of interest and transmit it into a suitable form to be analyzed. This is carried out in a processing circuit which can be given a video frequency definition because the signal beat frequency $F_b$ is much lower than that of the transmitter wave $F_e$, mostly considering the distance range of the obstacles with which this apparatus is involved. Thus one of the first functions of the processing circuits is the limitation of the frequency band. With this aim, an appropriate filtering stage to limit the frequency band of the received signals on the high and low frequency sides can be arranged after the balanced mixer 11 and the low noise amplifier 20. If the value of 10 KHz is adopted for $F_m$, for example and 22.5 MHz for $\Delta F$, and supposing the minimum and maximum distances of obstacles are respectively Dmin = 10 m and Dmax = 150 m, the useful frequency band would range from 30 KHz to 450 KHz. However, since the response inside the pass band must be equalized to account for the different intensity levels of the echo signals reflected by the obstacles, depending on their distance, the amplifier stage 20 is preferably followed by an equalizing stage 21 whose response curve can in this way be adapted to fullfill the previously described filtering requirements. In fact, the intensity of the echo signal is inversely proportional to the fourth power of the distance D. Therefore the voltage gain of the receiver should grow with frequency with a slope of 12 dB/octave. In practice, the amplifier and equalizer with filter functions can be wired as a single circuit. According to FIG. 2, the equalizer 21 is followed by an adapter stage 22 having low output impedance. This feeds the information signal along the line 14 to an analyzing circuit described later on.

Figure 6:
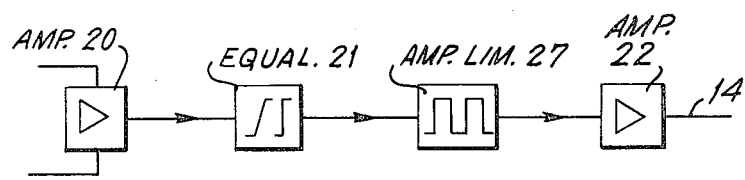
FIG. 6 illustrates a preferred embodiment of the invention in the form of a modification of the diagram of FIG. 2 and particularly pertaining to a circuit for processing the beat frequency signal.

According to the example of FIG. 6, the raw beat signal becomes elaborated in a different way. In the example of FIG. 6, the signal passes from the equalizer 21 to an amplitude limiting circuit 27, circuits of this type being well known and used in frequency modulation (FM) receivers. This limiter circuit 27 limits the signal amplitude to a level which is related to the gain of the amplifier 20 according to the considerations next described.

It is well known that the echo signal intensity in any radar type apparatus fluctuates in time in a casual way, depending on the shape of the obstacle and the direction in which the wave-front emitted by the radar impinges on this object. The frequency spectrum of these fluctuations, in a case like the one in which we are interested here, is included between zero and tenths of a cycle per second. The amplitude of these fluctuations can be quite large with ratios between maximum and minimum amplitudes of the order of 10 dB. When the diagram in FIG. 2 is used, the beat signal is transmitted to the processing circuits without other preventive elaboration than an amplification and a limitation of the frequency band, and one can obtain notable fluctuations in the intensity of the terminal signals. If, for example, the information is presented optically to the operator, one can get strong fluctuations of light from the optical indicators (usually light bulbs) such as, for instance, a flickering which besides being annoying to the operator, could also lead him to make a false interpretation of the nature of the obstacle detected. This flickering can be eliminated by the apparatus illustrated in FIG. 6, if the amplifier 20 has a high enough gain to make sure that the lowest intensity level of the received signal is, after amplification, brought above the clipping level of the amplitude limiting circuit 27. In this case, circuit 27 will always work to reduce the intensity of the signal which will thus remain constant.

In certain cases and depending on particular types of obstacles, it may not always be possible to obtain constancy of receiver output level, but this is not necessarily a drawback, as will be explained. According to another way of arranging the apparatus, the same result can be obtained by using an automatic gain control (AGC) circuit in place of the limiter 27, provided the control range is sufficiently wide (at least 60 db) and the control action is fairly fast, that is when the time constant of the controlling circuit is less than the duration of the shortest signal intensity fluctuation. This circuit is a little more complicated. However, it is not considered necessary to illustrate it because it can easily be understood and realized. However, a flickering can take place mainly when fairly short signals are received, particularly when a vehicle finds itself in front of a curve around which sizeable objects are to be found, such as, trees, bushes, poles, small constructions, etc. In this case, the emitted beam, which has a limited width, will intercept one by one these obstacles successively, thus producing the flickering of the luminous signals. In this way, the driver can, in most cases, recognize the quality of the obstacles. For instance, he can distinguish a motorcar, coming towards him and travelling on the same road, from any other obstacle which may be found off the road and knows that it is therefore not dangerous. In any case, the signal passes from the limiter 27 to the unity gain amplifier 22 (with very low output impedance), and through the line 14 to the analyzing and information displaying circuits.

The apparatus must analyze the information contained in the raw signal, which has been elaborated as described and present the analyzed information in suitable form to the operator, in particular to the driver of a motor vehicle. It includes means for discriminating the information relative to different obstacles or, to be more exact, the different obstacle ranges, and transducer devices to translate them successively into the desired form for presentation to the operator. Optical type transducers will be discussed but others of different form can be used such that, for example, acoustic signals could be associated with particular conditions at, say, critical distances or critical approaching relative speeds. Two or more different types of signalling could be associated in the same apparatus.

The analyzing apparatus separates the various beat frequencies one from another and applies the signals corresponding to the various frequencies to their proper transducer circuits intended to excite an equal number of terminal signals, such as light bulbs or warning lights, each associated with the distance of the obstacle corresponding to the frequency that excites it. According to one of the preferred embodiments of the invention, a discrete succession of frequencies and thus of obstacle ranges is established and to each corresponds a circuit including a selective amplifier or band pass filter, the whole system constituting a way of selectively allowing only the signals of the desired frequency to pass. These filtering devices constitute the apparatus for analyzing the information contained in the beat signal, according to the invention.

Figure 10:
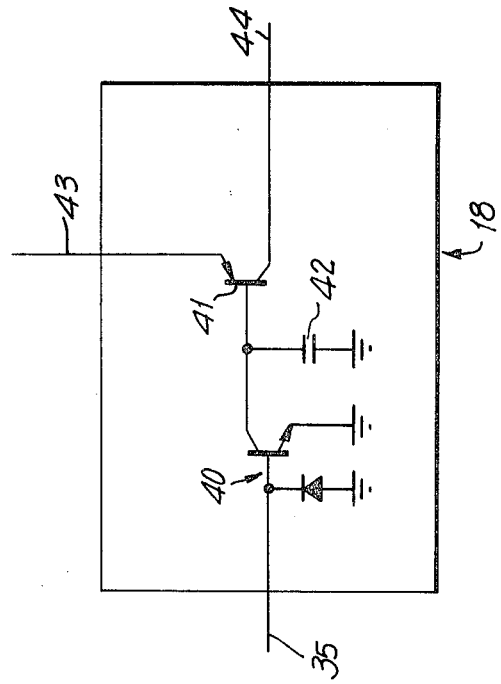
FIGS. 9 and 10 are schematical diagrams of elements used in the circuits of FIGS. 8 and 9.

Referring to FIG. 2 the filter devices (i.e., band pass filters or selective amplifiers) are indicated at 17. These can be marked, when necessary with a numeric index indicating the corresponding band. One of these devices is illustrated (using well known components in FIG. 9). Each of these is followed by a detector and lamp-drive circuit 18 (a) and a warning light 19. These elements can all be accompanied by a numeric index. These detectors and lamp-drive circuits are part of the signal transducer circuits and, in fact, when they receive a signal (already analyzed at the suitable frequency), they cause the corresponding warning lights 19 to light up. An example of one type of detectors and lamp-drive circuits is illustrated by the diagram of FIG. 10.

Figure 9:
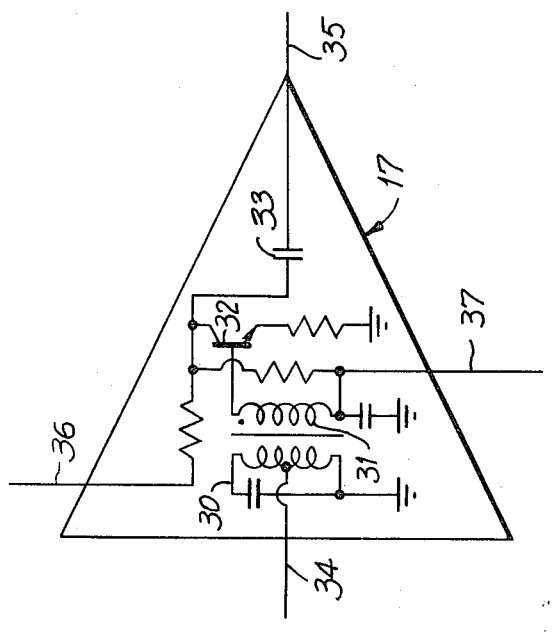

In the selective amplifier or filter illustrated in FIG. 9, there is a primary circuit 30 whose resonant frequency determines the frequency of the signal that can pass. The raw signal comes from the conductor 34 derived from the line 14 (see FIG. 2). If it contains a component with a frequency falling in the pass band, of pre-established width, around the resonant frequency of the circuit 30, this component is transferred to the secondary of the input transformer 31 and then to the base of the transistor 32 where it is amplified and transferred to the line 35 through the coupling condenser 33. The conductor 36 represents the power supply input while the conductor 37 has a function that will be explained later. The analyzed signal, processed in this way, arrives at the detector 18 (FIG. 10) via the line 35. The detector is composed of a diode-transistor rectifier-amplifier 40, from which the signal flows as a positive half-wave to the base of the second transistor 41. It is then smoothed by the condenser 42 and finally polarizes the base of the transistor 41, bringing it into conduction so that a current can pass to the feed lines 43 and 44 of the warning lights which constitute the device producing the signal destined for the operator. In this case, an optical signal is produced by the light bulbs 19 (see FIG. 2), which together with the detector and lamp-drive circuit just described, constitutes an optical transducer circuit.

In the example to be described it will be supposed that one must analyze a raw signal which contains frequencies between 30 and 450 KHz, with greater and lower frequencies already excluded. Fixing the range of the obstacle sensing apparatus between Dmin = 10 m, and Dmax = 150 m, and a resolution of 10 m, fifteen band pass filters 17 are necessary having a band width of 30 KHz, the first being tuned at 30 KHz, the second at 60 KHz and so on until the whole band is covered. To avoid blind spots in the range indication, it is necessary for the band width of each filter to be sufficiently wide, that is of about 30 KHz at 3 Db points. Besides the type of filter illustrated, filters of any active or passive type, constituted by operational amplifiers, or of the LC or RC type can be used. Naturally, a single filter can also be inserted in place of the band pass filter bank. In this case, the single band pass filter should be made to vary its tuning with continuity or by discrete steps by means of suitable electronic circuits which, activate the various indicating light bulbs 19, according to a pre-established succession.

It will be clear by now that whenever an obstacle which is situated inside the effective range of the apparatus described, reflects part of the electromagnetic energy that hits it, which (energy) after being picked up by the antenna 12 is converted into a beat frequency $F_b$ signal by the mixer, this signal which is amplified and equalized by the groups 20, 21 and 22 and eventually limited by the limiter 27 (FIG. 6), is further amplified and applied to the selective amplifying filters 17, one of which will pass only the frequency $F_b$. After being rectified by the detector 18, the signal is translated into an optical signal produced by the switching on of the corresponding light bulb 19.

Figure 5:
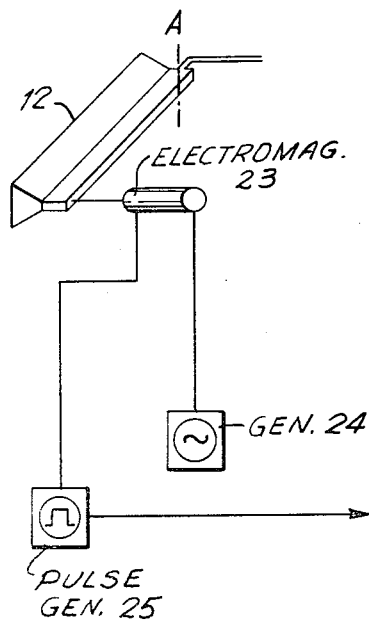
FIG. 5 illustrates a variation of the diagram of FIG. 2, applicable when, according to the invention, the apparatus is provided with a scanning antenna.
Figure 5:
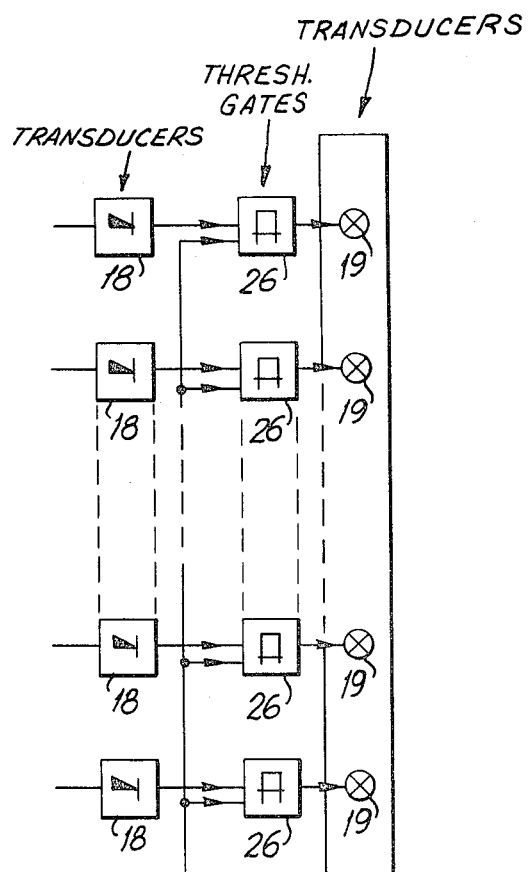

In the example of FIG. 5, each light bulb is illuminated only when the relative gate circuit 26 is opened by the pulses generated in the circuits 25.

In the examples described, each obstacle in the pre-established distance range is signalled. If there are many obstacles, all the corresponding warning lights will be turned on at the same time. In general, this is rather annoying because the perception and interpretation of the information becomes more difficult for the operator and his reaction is less sure. On the other hand, the signalling of distant obstacles when there are others much closer is not usually useful and only represents a disturbing element if danger is coming from an obstacle which is closer. Consequently, the apparatus is preferably made in such a way as to indicate only the nearest obstacle or at the most only the obstacles included in a limited range of distances from that which is nearest.

With this aim in view, the signal component (between many other components eventually present) that corresponds to the lowest frequency (i.e. to the nearest obstacle) contained in the raw signal spectrum, is used to inhibit the action of all or at least part of the otherwise present components of higher frequency. This is effected by using the filtered signal at the lowest frequency to inhibit the functioning of the transducer circuits corresponding to the frequencies that one wants to eliminate. This is effected for example, by making the desired signal act on the biasing circuits of the selective amplifiers or detectors or lamp-drive circuits corresponding to these latter frequencies. It is preferred that the lowest frequency signal component directly acts on the analyzing circuits, that is the selective amplifiers, so that they do not pass any signal, not even the ones corresponding to their band pass frequencies, as long as the inhibiting action is maintained.

When a variable band-pass filter is used as a analyzer, the desired working is obtained by acting on specific electronic tuning circuits so that the filter tuning, when there is a component of a certain frequency, does not exceed that frequency but continues to test and follow only the lowest frequency component.

Figure 7:
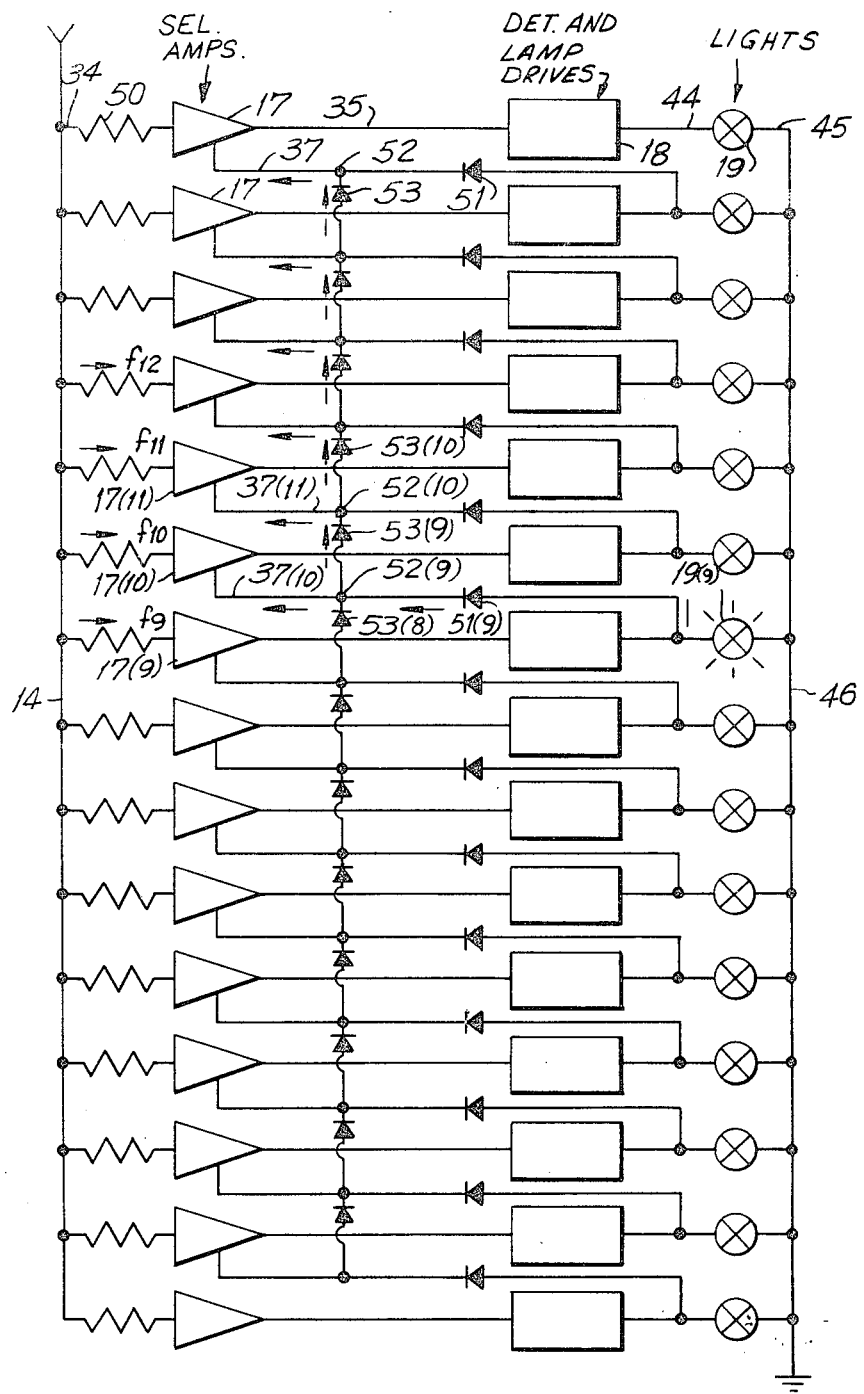
FIGS. 7 and 8 illustrate two preferred embodiments of the invention with reference to the analyzing and information displaying circuits.
Figure 8:
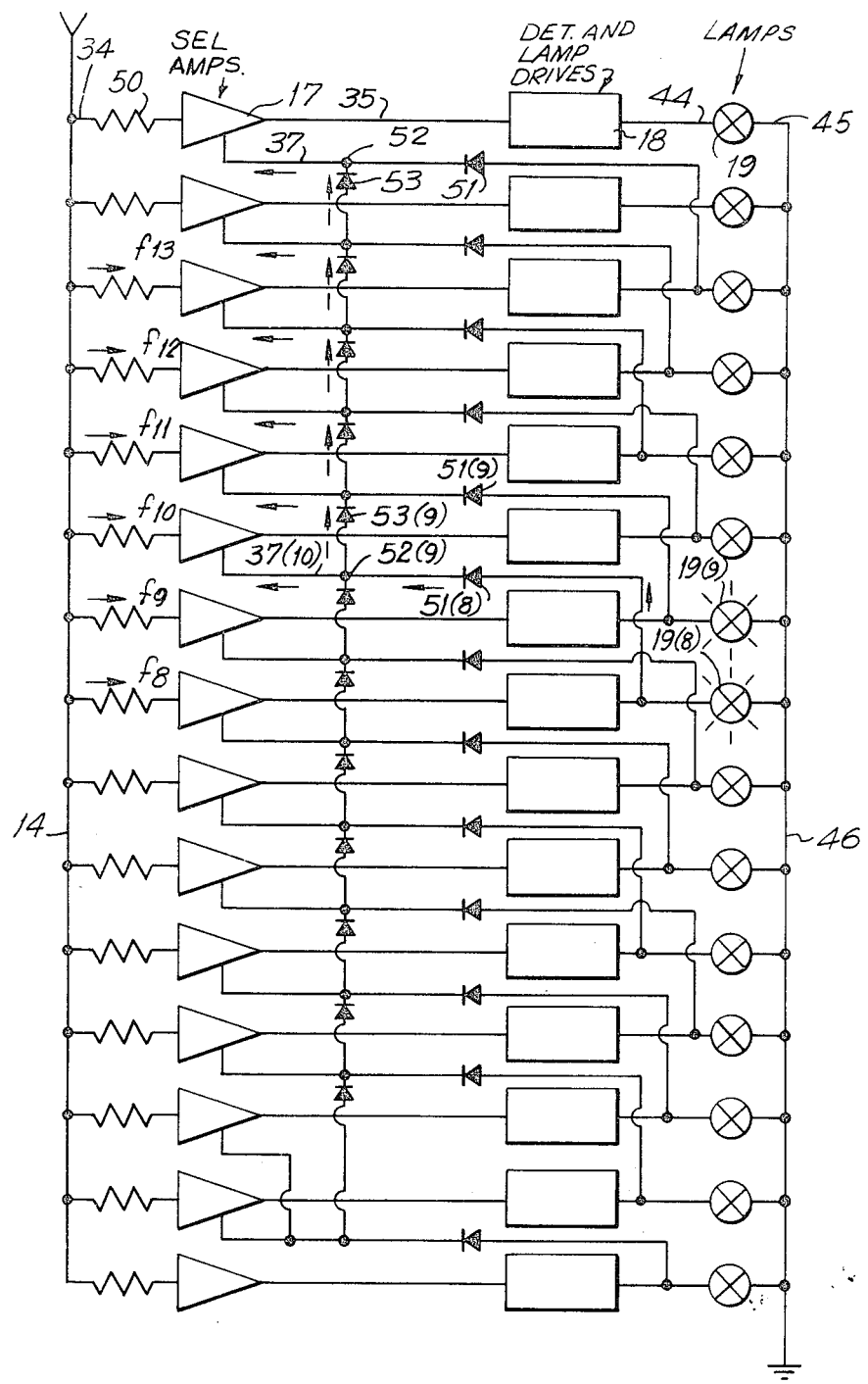

Other preferred examples, in which the above mentioned signalling limitations of the obstacles are realized, are illustrated in FIGS. 7 and 8, where the part of the apparatus preceding the analyzing and optical information displaying group (that is the part preceding the line 14) has been omitted. The filters 17 and the detectors and lamp-drive circuits 18 are respectively indicated with triangles and rectangles. To simplify the drawing, the power supply lines 36 and 43, respectively of the filters and detectors and lamp-drive circuits, have been omitted.

As stated above, there should be fifteen signalling circuits with relative light bulbs. Each optical signalling circuit includes the conductor 34 via which the signal arrives from line 14 and the conductor 45 connected to ground line 46, a resistance 50, a filter 17, a conductor 35, a detector and lamp-drive circuit 18, and a warning light 19. A numeric index can be added to each of these elements, and this indicates the particular circuit to which the element belongs. The resistances 50 have the job of decoupling among themselves the selective amplifiers of filters 17 and of raising their selectivity.

In FIGS. 7 and 8 are illustrated 15 circuits corresponding to increasing distances or ranges. Each one of these circuits is associated with an index from 1 to 15, from the bottom to the top of the drawing. Let it be assumed, as an example, that the single analyzing and display circuits correspond to a distance of 10, 20, 30, . . . 150 meters, to which the frequencies of 30, 60, 90, . . . 450 KHz correspond. In order to illustrate the operation of the diagram in FIG. 7, let it be supposed that a beat signal arrives from line 14, composed of a mixture of many frequency signals, $f_9$, $f_{10}$, $f_{11}$, $f_{12}$, corresponding to the signaling circuits 9, 10, 11, 12, and therefore to four simultaneously intercepted obstacles.

The ninth from the bottom light bulb, corresponding to the frequency $f_9$ of 270 KHz, will light up. Current will flow through the diode 51(9) connected to it. As indicated by the arrows, the current flows from the diode 51(9) to the junction 52(9) and, from this, on one side to the conductor 37(10) and the filter 17(10), and on the other side to the diode 53(9). From the latter, the current will flow through junction 52(10) and then, on one side, it will pass to the filter 17(11) and, on the other side, to the diode 53(10), and so on for all the successive circuits. There will be no current flowing through the diode 53(8) (and those preceding it) as this diode is inversely polarized. The current that flows to the filter 17(10) and the successive ones through the corresponding conductors 37 (see FIG. 9) causes the saturation of the transistors 32 of the filters tuned to the frequencies $f_{10}$, $f_{11}$, $f_{12}$, which will not pass the signals. Therefore, they do not cause the lighting of the associated warning lights.

If the signal of frequency $f_9$, is now terminated and all the others persist, all that has been stated would apply for the successive circuit corresponding to the frequency $f_{10}$. Then the tenth light bulb would light up with the successive ones remaining unlit. If a signal of still lower frequency is added to the four signals mentioned above, for example $f_5$, then the light bulb corresponding to the said signal would light up, in this case the fifth, and at the same time the ninth would be turned off, all the filters from the fifth stage upwards remaining inhibited. In this way, when there are more obstacles placed at different distances, only the closest are indicated, thus reducing the amount of information to an indispensable minimum.

According to the example in FIG. 8, the procedure mentioned above is still valid. However, all the diodes 51 are no longer connected to the junctions 52 having the same index, from which the current can pass to inhibit the filter 17 of the successive stage. Let it be assumed that a circuit is omitted. From the diode 51(8), for instance, the current flows to the junction 52(9); and then through the conductor 37(10) to the filter 17(10) and to the diode 53(9), and then on to the successive junctions, filters and diodes 53. Consequently, if there is a signal that includes, for instance, the frequencies $f_8, f_9, f_{10}, f_{11}, f_{12}, f_{13}$, only the circuits 10, 11, 12 and 13 would remain inhibited and the corresponding light bulbs would not light. However, the warning lights corresponding to the frequencies $f_8$ and $f_9$ would light. Thus, it is possible to have two adjacent light bulbs simultaneously lit instead of one alone. This example gives a less precise range indication. However, it is useful in order not to lose the obstacle from "sight". In fact, when an obstacle happens to be at a range indicated exactly by the corresponding warning light, such warning light will be lit. If now the obstacle begins to approach, the brightness of the above-mentioned warning light will decrease, but before turning off completely, the one immediately preceding it will have already turned on until its brightness reaches a maximum when the obstacle is at the exact range indicated by this second warning light, and so on. This system has been found particularly efficient in trials.

It is now evident that, by multiplying the number of circuits and light bulbs and by diminishing the brightness pulsations of the light bulbs, one can get the impression of a luminous point that moves in such a way as to enable an operator to visualize an obstacle by the progressive lighting of adjacent light bulbs.

The characteristics and advantages of the described invention will now be quite evident. This apparatus is able to provide the driver of a vehicle with a useful information on the presence and distance of obstacles, allowing him also to judge easily the relative speed of his vehicle with respect to that obstacle. The information display is immediate and allows the driver to make a timely reaction.

The apparatus according to the invention is easy to construct and very economical. The circuits which constitute it are very simple and the components available at a low cost. The whole apparatus can be built completely with solid state devices. Therefore, it has a high degree of safety and reliability, and can be fed directly from the car battery with a very limited power consumption, of the order of 10–15 watts. Also, the antenna can be simple and of easy construction and of small dimensions. The whole apparatus can be enclosed into a single container to be installed in the interior of a vehicle wherein it takes up very little space.

What is claimed is:

1. Apparatus adapted for being installed on a vehicle for detecting obstacles and indicating the distance thereof, said apparatus comprising wave propagation means to emit a continuous periodically frequency modulated wave in accordance with a predetermined time pattern, receiving means for receiving the wave when it is reflected by said obstacles and for interacting the emitted wave with the reflected wave to obtain a beat frequency raw signal whose form depends on the presence and distance of the obstacles, analyzing means to obtain from said raw signal at least one signal substantially clear of disturbing elements and representing the presence and distance of the obstacles, transducer means to transform the cleared signals into a signal of a kind perceivable by an operator to communicate to him information concerning the obstacles, said analyzing means comprising a plurality of circuits each associated with a limited frequency band of beat signals and consequently to a limited range of distances of obstacles, said transducer means including transducer devices connected to a respective analyzing circuit to transform the signal into a signal of different kind, directly perceptible by an operator, each transducer device being activated by the corresponding frequency of the raw signal and indicating to the operator the presence of an obstacle in the range associated with the corresponding frequency, and means for limiting the number of transducer devices which can be activated simultaneously, and for allowing only the activation of the transducer device corresponding to the lowest frequency range contained in the raw signal.

2. Apparatus according to claim 1, including means for allowing only the activation of two transducer devices corresponding to the two lowest frequency ranges contained in the signal.

3. Apparatus adapted for being installed on a vehicle for detecting obstacles and indicating the distance thereof, said apparatus comprising wave propagation means to emit a continuous periodically frequency modulated wave in accordance with a predetermined time pattern, receiving means for receiving the wave when it is reflected by said obstacles and for interacting the emitted wave with the reflected wave to obtain a beat frequency raw signal whose form depends on the presence and distance of the obstacles, analyzing means to obtain from said raw signal at least one signal substantially clear of disturbing elements and representing the presence and distance of the obstacles, transducer means to transform the cleared signals into a signal of a kind perceivable by an operator to communicate to him information concerning the obstacles, said analyzing means comprising a plurality of circuits each associated with a limited frequency band of beat signals and consequently to a limited range of distances of obstacles, said transducer means including transducer devices connected to a respective analyzing circuit to transform the signals into a signal of different kind, directly perceptible by an operator, each transducer device being activated by the corresponding frequency of the raw signal and indicating to the operator the presence of an obstacle in the range associated with the corresponding frequency, and means for taking part of the current supplied to each transducer and applying it at least to part of the analyzing circuits tuned to all the higher frequencies than the one to which the latter said transducer is connected.

4. Apparatus adapted for being installed on a vehicle for detecting obstacles and indicating the distance thereof, said apparatus comprising wave propagation means to emit a continuous periodically frequency modulated wave in accordance with a predetermined time pattern, receiving means for receiving the wave when it is reflected by said obstacles and for interacting the emitted wave with the reflected wave to obtain a beat frequency raw signal whose form depends on the presence and distance of the obstacles, analyzing means to obtain the said raw signal at least one signal substantially clear of disturbing elements and representing the presence and distance of the obstacles, transducer means to transform the cleared signals into a signal of a kind perceivable by an operator to communicate to him information concerning the obstacles, said wave propagation means including a transmitting and receiving antenna characterized by a beam width of 1° to 5° in the horizontal and by a substantially larger beam width in the vertical, said antenna having a scanning movement in the horizontal, and control means to allow the activation of said transducer means only when the antenna faces in selected directions.

5. A method for indicating obstacles in the path of a vehicle and indicating the distance of the obstacles, said method comprising generating and transmitting a continuous wave periodically frequency modulated according to a predetermined time pattern, receiving echo waves reflected by the obstacles, beating the transmitted wave with the reflected echo waves to obtain a raw signal whose form depends on the presence and distance of the obstacles, processing the raw signal to obtain a substantially purified signal free of disturbing elements and representing desired information relative to at least one obstacle, and the transforming of the thusly processed signal into a signal of a kind directly perceptible by the operator of the vehicle to communicate to him the desired information; said method further including splitting the raw signal into a spectrum of component signals with frequencies included in determined bands corresponding to obstacles situated at different distances, and transforming a limited number of these component signals contained in the lowest frequencies band into signals of a kind directly perceptible by the operator to eliminate the component signals of higher frequencies.

* * * * *